United States Patent [19]
Ganzel et al.

[11] Patent Number: 5,884,985
[45] Date of Patent: Mar. 23, 1999

[54] TRACTION CONTROL SYSTEM HAVING PILOT OPERATED VALVES

[75] Inventors: Blaise J. Ganzel, Ann Arbor; Ronald L. Sorensen, Erie, both of Mich.

[73] Assignee: Kelsey-Hayes, Livonia, Mich.

[21] Appl. No.: 684,596

[22] Filed: Jul. 19, 1996

Related U.S. Application Data

[63] Continuation-in-part of Ser. No. 504,299, Jul. 20, 1995.

[60] Provisional application No. 60/001,249 Jul. 20, 1995.

[51] Int. Cl.$^6$ .................................................. B60T 8/34
[52] U.S. Cl. ................................. 303/113.2; 303/113.4; 303/116.1; 303/119.1
[58] Field of Search ............................. 303/113.2, 113.4, 303/116.1, 119.1; 364/426.01, 426.03, 426.015, 426.016, 426.023, 426.027; 137/596.14, 596.16, 596.17

[56] References Cited

U.S. PATENT DOCUMENTS

| | | | |
|---|---|---|---|
| 3,523,553 | 8/1970 | Beck et al. | 137/596.14 |
| 3,580,280 | 5/1971 | Reis | 137/596.14 |
| 5,213,133 | 5/1993 | Ellett | 137/596.14 |
| 5,299,858 | 4/1994 | Beck | 303/113.2 |
| 5,405,191 | 4/1995 | Nishiyama et al. | 303/113.2 |

*Primary Examiner*—Peter M. Poon
*Attorney, Agent, or Firm*—MacMillan, Sobanski & Todd, LLC

[57] ABSTRACT

A hydraulic braking system providing anti-lock braking ("ABS") and traction control ("TC") incorporates a normally closed pilot-operated traction control switching valve to permit brake pressure in the driven wheel greater than master cylinder pressure. A dual flow return path can be used during brake release. The system also uses a normally open pilot-operated supply valve between the pump inlet and the master cylinder. The normally open pilot-operated valve references a low pressure fluid source and uses low friction seals.

9 Claims, 8 Drawing Sheets

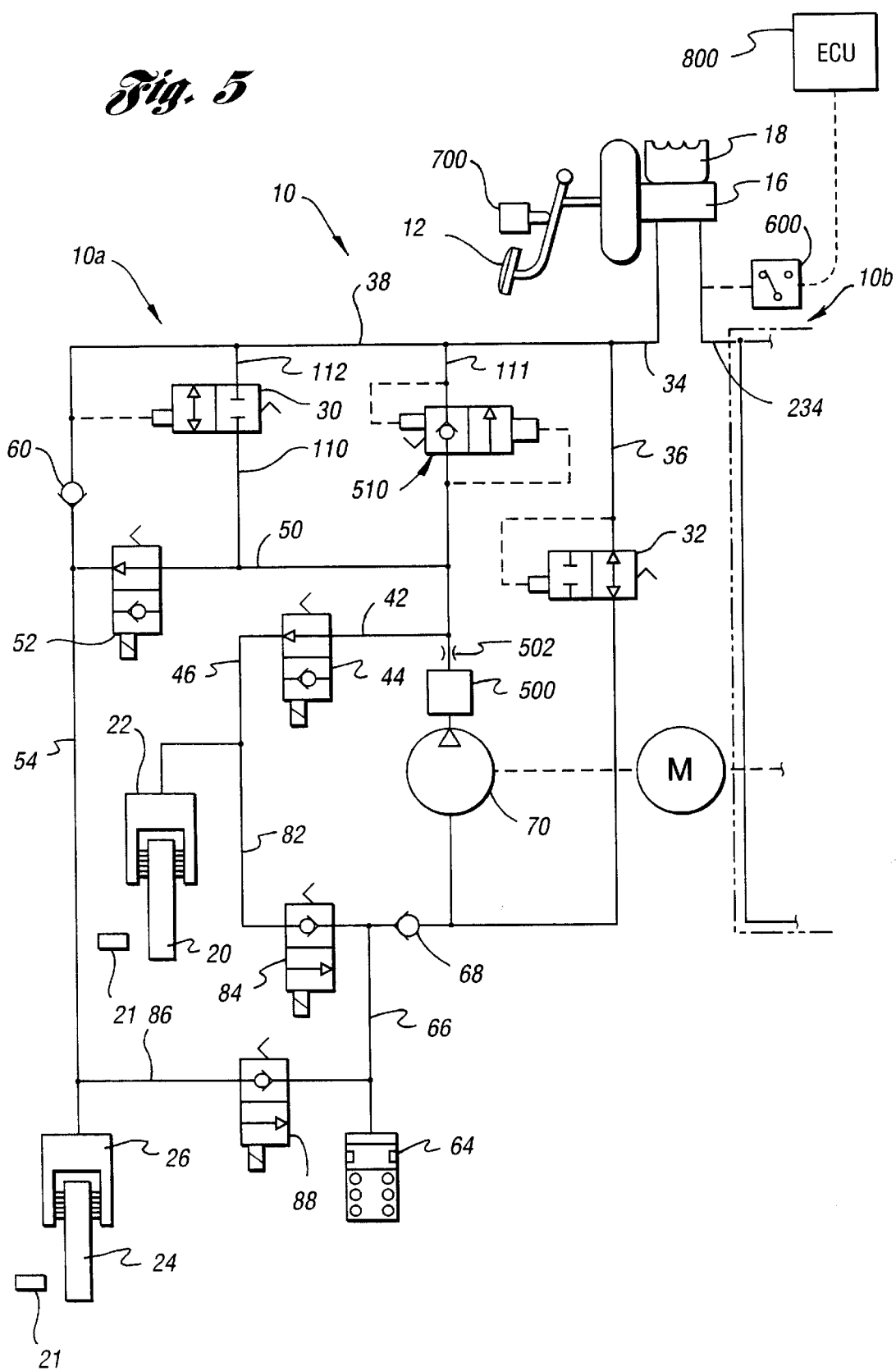

TRACTION CONTROL SYSTEM HAVING PILOT OPERATED VALVES

CROSS REFERENCE TO RELATED APPLICATIONS

This application is a continuation-in-part of application Ser. No. 08/504,299 filed Jul. 20, 1995 and this application also claims the benefit under 35 U.S.C. §119(e) of provisional application Ser. No. 60/001,249 filed Jul. 20, 1995.

BACKGROUND OF THE INVENTION

This invention relates to traction control systems as integrated into vehicle braking systems, and including particular control valve assemblies used in such systems.

BACKGROUND ART

Three modifications are commonly made to conventional anti-lock braking ("ABS") systems in order to integrate a traction control ("TC") function, namely, (i) the pump must be restructured so as to be a self-priming pump, (ii) provision must be made for providing fluid to the pump inlet, i.e. a "priming" valve, and (iii) providing the means of closing the circuit so that the pump can build pressure at the driven wheel brake higher than that originating from the master cylinder, a function normally provided by a "switching" valve. At least one of these valves, the switching valve, has heretofore been designed as a solenoid controlled or actuated valve. In the conventional split brake system then, this would require two solenoid actuated valves, i.e. one for each side of the brake system.

SUMMARY OF THE INVENTION

The invention contemplates elimination of the conventional solenoid actuated switching valve by incorporation of a normally closed pilot-operated valve, thereby reducing the overall size of the ABS/TC housing reducing the complexity of the system, eliminating the electronics associated with the control of two extra solenoids, and reducing expense.

The invention also contemplates a uniquely and efficiently constructed normally closed pilot-operated switching valve for use in the above-described system.

The invention further contemplates a uniquely and efficiently constructed normally open pilot-operated pump inlet supply valve. The normally open pilot-operated valve references a low pressure brake fluid source to allow the use of low friction seals which provide for a reduction in actuation pressure required to shuttle the valve. By referencing a low pressure brake fluid source any brake fluid that leaks past the valve seals can be recovered back into the brake system.

Various objects and advantages of this invention will become apparent to those skilled in the art from the following detailed description of the preferred embodiment, when read in light of the accompanying drawings.

BRIEF DESCRIPTION OF THE DRAWINGS

FIG. 4 is an elevation view in cross-section of a normally open pilot operated pump supply valve in accordance with the present invention and showing the end closure member as taken along section lines 4—4 of FIG. 4a.

FIG. 5 is a schematic view similar to FIG. 1 and showing a second embodiment of a braking system in accordance with the present invention.

DETAILED DESCRIPTION OF THE PREFERRED EMBODIMENTS

Figure 1:
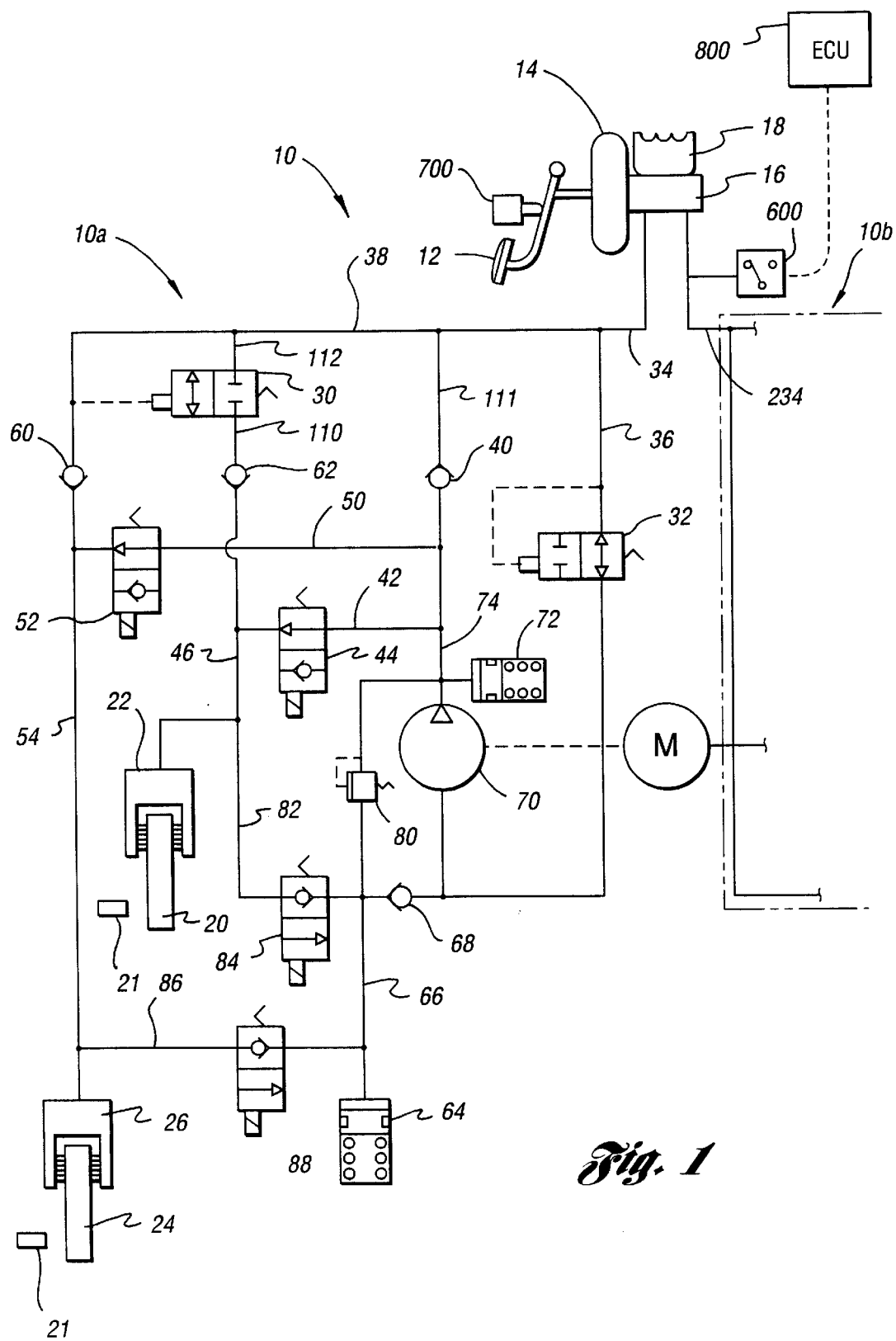
FIG. 1 is a schematic view of one-half of a diagonal split, pedal isolated type vehicular braking system including an ABS/TC unit in accordance with the present invention.

In FIG. 1, there is shown a schematic of the hydraulic circuit, generally designated by numeral 10, and components in the circuit for an anti-lock brake system coupled with traction assist constituting an integrated electrical/hydraulic control unit ("HCU").

As a general description, the system implements the functions of anti-lock braking and traction control in an integrated hydraulic circuit. This system may be referred to as an 8-valve, pedal isolated system. The actuation of the ABS and TC systems includes use of an electronic control unit ("ECU") which responds to signals indicative of wheel speed under dynamic operating conditions.

The traction control feature is complementary to the anti-lock brake feature. Upon application of the brake pedal, the hydraulic circuit transitions from (a) the traction control-available mode, into (b) the braking mode in which the brakes may be applied through either (i) normal manual actuation, or (ii) ABS-controlled actuation.

The changeover between states (i.e. ABS versus TC) of the hydraulic circuit involves the use of pilot valves which shift in response to hydraulic pressure changes associated with brake pedal application.

In a closed system, the pump draws hydraulic fluid for traction control from the master cylinder reservoir through the same line which supplies fluid pressure for the normal braking function.

In detail, as seen in FIG. 1, brake pedal 12 is coupled to a master cylinder 16 through a vacuum booster unit 14. A brake position switch 700 is located near the brake pedal to indicate when the brake pedal has been depressed and when the pedal has returned to its unactuated position. The master cylinder is of the tandem chamber type with an associated fluid reservoir 18, and it supplies brake fluid to a pair of wheel brakes 20 and 24.

Only one-half of the system is shown, designated 10a, and in this case the brake 20 is on the driven wheel (e.g. a front wheel) and the brake 24 is on the opposite non-driven (rear) wheel. The non-illustrated remaining one-half of the brake system, designated 10b, is identical to that shown as applied to the remaining pair of wheels, and functions in the same manner as that illustrated.

Sensors 21 read the speed of the respective wheel relative to the brake, thus sensing a locking condition. In the case of sensor 21 on the driven wheel 20, a slip condition is also sensed. Intermediate the master cylinder 16 and wheel brakes 20, 24 is located the ABS/TC unit. Its components include a dual opposed piston, reciprocating piston-type pump 70 driven by a motor M. The one pump piston feeds the system segment shown, and the opposed piston (not shown) feeds the other one-half of the system. Also included is a high pressure accumulator 72, a low pressure accumulator 64, a pair of solenoid actuated, normally open isolation valves 44, 52, a pair of normally closed hold/dump valves 84, 88, a normally closed pilot operated switching valve 30, a normally open pilot-operated pump supply valve 32, a series of one-way check valves 40, 60, 62, 68 and a pressure relief valve 80. Optionally, check valve 68 could be eliminated. Also, isolation valve 44 and dump valve 84 could be combined into a single wheel brake fluid pressure control valve assembly.

NORMAL BRAKING OPERATION

During normal braking, upon application of the brake pedal 12, hydraulic pressure is transmitted from the master cylinder through line 34, which divides into lines 36 and 38. The hydraulic pressure in line 36 actuates the pilot-controlled valve 32. The hydraulic pressure in line 38 actuates the pilot-controlled valve 30. Valves 30 and 32 are each two-port, two-state hydraulic valves with venting to atmospheric pressure through a third port. The normal (or unactuated) state of valve 30 is closed (i.e. non-flowing). The normal (or unactuated) state of valve 32 is open (i.e. flowing). The valve 32 responds to a hydraulic pressure increase in line 36 by closing. The valve 30 responds to the increase in hydraulic pressure in line 38 by opening. A preferred set point for each valve to change state is 85 p.s.i.g.

The hydraulic pressure increase in line 38 is transmitted through check valve 40 and divides into lines 42 and 50. Line 42 continues in a flow path to the driven wheel 20. Line 50 continues in a flow path to the non-driven wheel 24.

The hydraulic pressure in line 42 passes through a normally-open, solenoid actuated valve 44. Similarly, the hydraulic pressure signal in line 50 passes through a normally open, solenoid-actuated valve 52. Each of the valves 44 and 52 is a two-port, two-state valve.

The hydraulic pressure in line 42 continues through solenoid valve 44 into line 46 to the cylinder on the brake 22 of the driven wheel 20. Similarly, the hydraulic pressure passes in line 50 through the solenoid valve 52 then continues through line 54 to the cylinder on the brake 26 of the non-driven wheel 24.

In summary, during normal braking operation, (1) the pilot valves 30 and 32 are actuated to open and closed states, respectively, and (2) the open states of the solenoid-actuated valves 44 and 52 is maintained.

On brake release, and until line pressure from the wheel brake cylinders 22, 26 in lines 50 and 54, respectively, drops below 85 p.s.i.g., the released brake fluid from driven wheel 20 will flow to the master cylinder through dual paths, namely (i) through line 46 directly through check valve 62 and now open (actuated) switching valve 30 to line 38 and (ii) through (non-actuated) isolation valve 44, through line 50, open (non-actuated) isolation valve 52 provided for the non-driven wheel, and then through lines 54 and 38, successively. Below 85 p.s.i.g., as switching valve 30 shuttles to its normally closed position, driven wheel brake release continues only through open isolation valve 52. The brake release for non-driven wheel 24 is always through lines 54, 38 to master cylinder 16.

ABS BRAKING OPERATION

The ABS mode becomes operative when the system senses one of the wheels having a rotational speed lower than that normally associated with the vehicle speed while the brake pedal is applied, i.e. a lock-up condition. A signal indicative of this condition is applied to the electronic control unit to trigger ABS override of the manual braking pressure applied by the vehicle operator.

a. ABS Dump Mode

In the ABS dump mode, the hydraulic pressure in the cylinders of the wheel brakes is relieved to abate braking action. This requires actuation of solenoid actuated dump valves 84, 88 to create a flow path from the wheel brake cylinders 22 and 26 to the low-pressure accumulator 64.

The pilot valves 30 and 32 remain in their actuated states (open and closed, respectively). Also, the solenoid valves 44 and 52 continue in their actuated states (both closed). The pump 70 is driven by the motor M, but the blockage of the flow paths to the wheel brake cylinders (due to closing of solenoids 44 and 52) causes the pump outlet to continue to bypass through the pressure relief valve 80 and return to the pump inlet in a closed-loop fashion.

The actuation of solenoid valves 84 and 88 opens a flow path from the wheels to the low-pressure accumulator 64. Each of the valves 84 and 88 is a solenoid actuated, two-port, two-state valve. The normal (or unactuated) state of valves 84 and 88 is closed to flow from the wheel brake cylinder. However, upon actuation, these valves open and create a path to the low-pressure accumulator 64. The path from the wheel brake cylinder 22 is through line 82, valve 84 and line 66. The path from the wheel brake cylinder 26 is through line 86 and valve 88.

b. ABS Hold Mode

In the ABS hold mode, the valves 30 and 32 continue in their actuated states (open and closed, respectively).

The ABS hold mode is implemented by the ECU through actuation of the solenoid actuated isolation valves 44 and 52. Each of these valves, upon energization of the solenoid, transitions from an open state to a closed state to interrupt the flow path for hydraulic fluid to the wheel brake cylinders 22 and 26 from the master cylinder.

The closure of valves 44 and 52 results in a pressure build-up at the outlet of pump 70 and charges the high pressure accumulator 72. When the pressure at the pump outlet exceeds a predetermined value, the pressure-limiting valve 80 opens to create a closed loop return path between the outlet and inlet of the pump 70.

By this valving arrangement, the ABS hold mode is obtained.

c. Brake Apply Mode

In the ABS brake apply mode, the valves 30 and 32 remain actuated (due to continuing application of the brake pedal 12). The motor M continues to drive pump 70. The inlet side of the pump draws fluid from the low-pressure accumulator 64 through line 66 and check valve 68. The outlet side of the pump 70 supplies pressurized fluid to the wheel brake cylinder 22 of the driven wheel 20 through a flow path defined by line 74, line 42, valve 44 and line 46. The flow path to the wheel brake cylinder 26 of non-driven wheel 24 is through line 74, line 50, valve 52 and line 54. The high-pressure accumulator 72 at the outlet of the pump 70 discharges immediately to line 74 to provide high pressure fluid flow at a rate not available from the pump alone.

THE TRACTION CONTROL MODE

The traction control mode is operative when one of the driven wheels experiences rotation at a speed indicative of slippage, i.e., greater than the vehicle speed. This condition is detected by wheel speed sensor 21 which supplies a signal to the electronic control unit. Wheel slippage may occur when the driver is attempting to accelerate the vehicle on a low traction surface, e.g., an ice patch.

The traction control is achieved by selectively applying braking pressure to the driven wheel(s) to reduce its rotation velocity to enhance traction between the tire and the road surface. The non-driven wheel is not acted on by braking forces in the traction control mode. The traction control mode is complementary to the ABS control mode. Therefore, the pilot-actuated valves 30 and 32 are in opposite states. Specifically, the valve 30 is in its normal (or unactuated) closed state, and the valve 32 is in its normally open state.

When the valve 32 is normally open (i.e., no application of the brake pedal 12 or application at a significantly low force incapable of building pressure to 85 p.s.i.g.), the master cylinder 16 (and its reservoir 18) is connected through line 36 to the inlet of the pump 70. This allows pump 70 to draw hydraulic fluid from the reservoir 18 of the master cylinder 16. The closing of valve 32 (i.e., upon normal application of the brake pedal 12) interrupts this fluid supply path to the pump 70.

The valve 30 is normally closed in the traction control mode (assuming no brake pedal pressure) and line 38 is isolated from the branched lines 42 and 50 leading to the wheel brake cylinders 22 and 26, respectively, due to check valve 40.

a. Traction Control Apply Mode

In the traction control apply mode, the solenoid valve 52 is actuated to its closed (one-way) state. This isolates the outlet of the pump 70 from the line 54 leading to the wheel brake cylinder 26 of the non-driven wheel 24. Valve 52 will remain closed throughout all traction control modes.

The outlet of the pump 70 is communicated to the wheel brake cylinder 22 of driven wheel 20 through normally open solenoid valve 44. The flow path from the outlet of the pump 70 comprises line 74, line 42, valve 44 and line 46. The return path is interrupted by the normally closed (one-way) solenoid valve 84.

The high pressure accumulator 72 provides a ready source of pressurized fluid following the first (TC) brake apply pulse. The accumulator 72 maximizes the response time for traction control, i.e., minimizing the time required for the system to bring up the pressure at the driven wheel brake.

In summary, the traction control apply mode is attained by actuating valve 52 to its closed state. All other valves in this one-half of the circuit are in their unactuated states.

b. Traction Control Hold Mode

In the traction control hold mode, the solenoid valve 44 is actuated to isolate the outlet of the pump 70 from the wheel brake cylinder 22 of the driven wheel 20. Also, solenoid actuated isolation valve 52 continues to be actuated to isolate wheel brake 26 of the non-driven wheel 24. This isolation of both brakes from the outlet of the pump causes the setting of the pressure-relief valve to be exceeded, and the output of the pump to flow through the pressure relief valve 80 and return to the pump inlet.

c. Traction Control Dump Mode

In the traction control dump mode, the hydraulic pressure at the cylinder of wheel brake 22 is relieved to decrease the braking force on the driven wheel 20. The pressure relief is accomplished by opening a return path to the reservoir 18 of the master cylinder 16.

The flow path from the wheel cylinder to the reservoir is open upon actuation of solenoid actuated dump valve 84. The flow path comprises line 82, dump valve 84, check valve 68, valve 32, line 36 and line 34.

The output of the pump 70 continues to cycle in a closed-loop manner due to the continued closure of solenoid actuated isolation valves 44 and 52, which isolate the wheel brakes 22 and 26, respectively.

Thus, the hydraulic circuit realizes the functions of both anti-lock braking and traction control in a closed system. The transition between the ABS and TC functions is implemented by a companion pair of pilot-actuated, two-port, two-state valves. The pilot pressure required to transition the valves between states is controlled by application of the brake pedal. This results in a simpler and less costly system than other types of ABS/TC closed systems which use solenoid actuation of selector valves under supervision of a electronic control unit to transition between the ABS and TC modes. Nevertheless, it will be recognized that the use of such a system, particularly the pilot-operated switching valve 30, for all practical purposes is limited to diagonally split braking systems whereby during brake release a supplemental fluid flow return path, returning fluid from the brake cylinder 22 to the master cylinder is provided through the non-driven wheel isolation valve. This supplements the fluid flow return through the pilot-operated switching valve 30 during any brake release mode at master cylinder pressures above 85 p.s.i.g. and provides the sole fluid flow return path to the master cylinder when the normally closed pilot-operated switching valve 30 shuttles from its open position to its closed position as the line pressure falls below the valve's actuation pressure, namely below 85 p.s.i.g. in the example discussed herein.

The normally closed pilot-operated valve 30 may be replaced with a conventional normally open, solenoid operated valve. This circuit is called a 10-valve, pedal isolated system. An electronic control unit can be used to operate the solenoid valve so that the 10-valve system will function the same as the 8-valve, pedal isolated system discussed above. Specifically, during brake apply and release and all ABS modes, the solenoid valve will remain in its unactuated, open position. During all traction control modes, the solenoid valve will be actuated to its closed position. All other valves in the 10-valve, pedal isolated system will be located in the same positions and perform in the same manner as those valves in the 8-valve, pedal isolated system discussed above.

As noted above, use of a check valve 68 between the pump 70 and low pressure accumulator 64 is optional. Without it, the 8-valve or 10-valve system functions in the same manner but allows the possibility that a prolonged significantly low force application of the brake pedal 14 can result in filling the low pressure accumulator 64.

Figure 2:
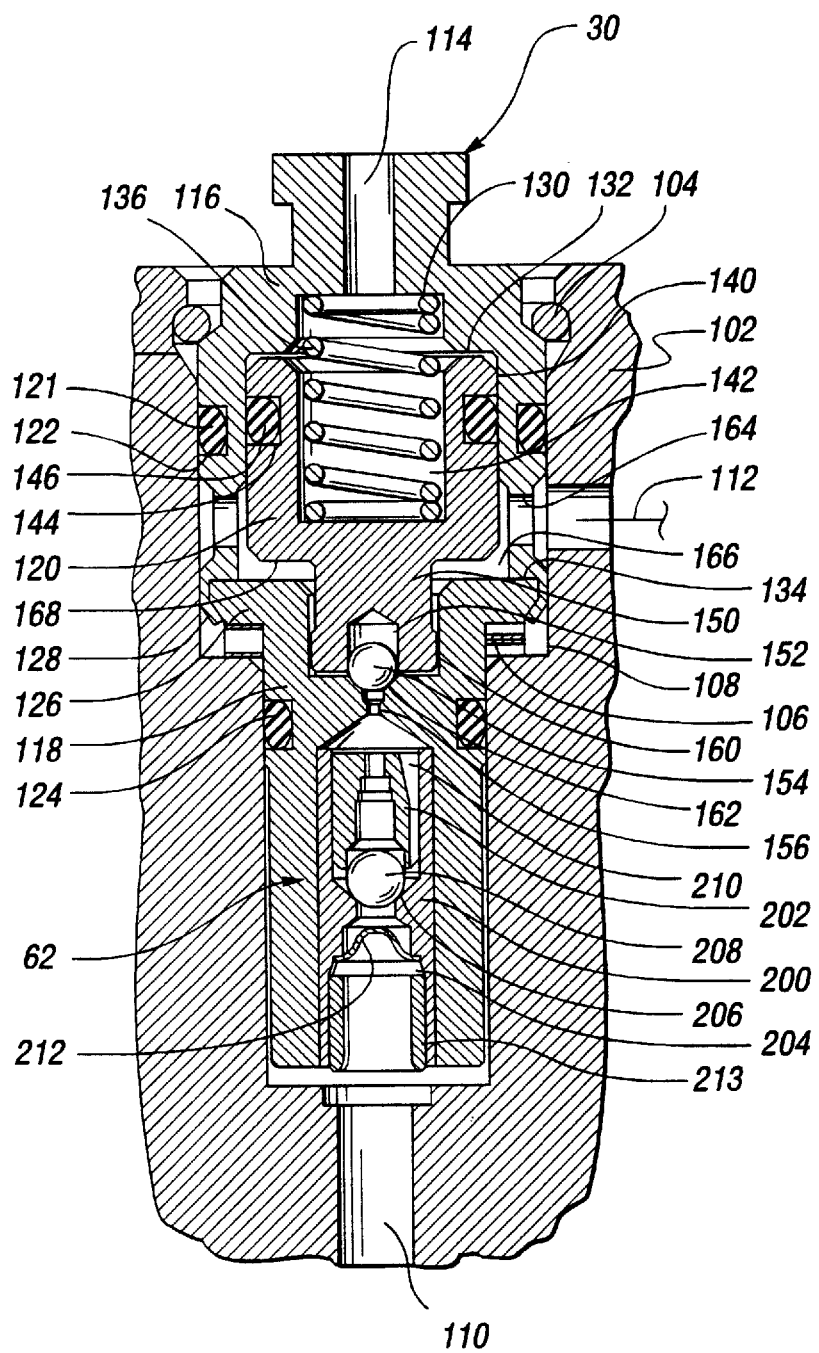
FIG. 2 is an elevation view in cross-section of a normally closed pilot-operated switching valve in accordance with the present invention for use with the pedal isolated hydraulic circuit of FIG. 1;.

As shown in FIG. 2, the normally closed pilot-operated switching valve comprises a cartridge assembly, generally designated 30, retained in the housing 102 by means of outwardly biased snap ring 104 holding the cartridge axially against the force of wave spring 106 positioned within housing counterbore 108.

Feeding into the counterbore are hydraulic lines 110, 112, placing the valve in direct fluid communication with the driven wheel brake cylinder 22 and master cylinder 16, respectively. At the opposite end of the cartridge there is provided a fluid passage 114 in communication with atmospheric pressure.

Cartridge 30 comprises two basic components, namely, a two-piece valve body comprising an upper body portion 116 and a lower body portion 118, and a linearly moveable piston 120 located primarily within the upper body portion 116 and concentrically and axially aligned therewith. Upper body portion 116 is sealed relative to the counterbore by means of an O-ring 121 located within an annular groove 122 within the upper body portion 116. Lower body portion 118 is sealed relative to the housing counterbore 108 in the same manner by means of O-ring 124. Lower body portion 118 is cylindrical and includes an annular collar 126 extending radially outward from one end thereof The upper body member 116 is also cylindrical and basically cup-shaped with one end thereof receiving the annular collar 126 of the lower member 118 and being swaged over the annular collar as shown at 128 as a final assembly step to thereby provide retention at this juncture having a self-contained linearly moveable piston-type ball valve within the cartridge, as described below, and with the upper and lower members being axially fixed relative to one another.

Upper member 116 includes a plurality of concentric counterbores, each providing a shoulder 130, 132, 134. Shoulder 130 provides a chamber and stop for receiving a compression-type coil return spring 136. One counterbore 140 defines a piston cylinder for receiving cylindrical piston 120. The piston includes a counterbore 142 having a predetermined depth less than its total length to provide a chamber and seat for receiving return spring 136. Piston bore 142 and the adjacent upper sleeve counterbore are preferably the same diameter, that being only slightly greater than the diameter of the coil spring to thereby minimize any radial play. In the annular outer wall of the piston 120, there is provided an annular groove 144 for receiving an O-ring 146 for retaining a fluid tight seal between the reciprocating piston 120 and the upper body member 116.

At the other end of the piston, there is an annular axially extending stem 150 of reduced diameter having a concentric counterbore 152 of fixed depth sufficient in diameter to receive a sealing ball 154. The ball 154 is press-fitted within counterbore 152.

Lower member 118 includes a concentric throughbore defining a flow passage connecting to line 110 and including an orifice 156. The throughbore is counterbored at both ends of the lower member so as to provide a first counterbore communicating with housing fluid passage 110, and a second counterbore defining a chamber 160 for receiving in loose sliding relation the stem 150 of the piston 120. At the juncture of the throughbore with the counterbore, there is a spherical valve seat 162.

The cartridge assembly components as above-described are sized such that the compression return spring 136 holds ball valve 154 on its seat 162 to provide a normally closed pilot valve which will shuttle open.

Upper body member 116 further includes a fluid port 164 communicating on one side with the housing fluid passage 112 and communicating on the other side, namely its inner wall, with the fluid chamber 166 defined by a predetermined radial clearance between the outer annular wall of the piston and the inner annular wall of the upper body portion 116, which, as shown, is provided by means of reducing the outer wall cross-sectional thickness from both sides of the upper body member at a point between the O-ring seal 121 and the swage joint 128.

In operation, fluid pressure from line 112 will be exerted on the cross-sectional area of the annular land 168 of the piston, thereby forcing the piston against the force of the return spring and lifting the ball 154 from its valve seat when the fluid pressure from line 112 is sufficient to overcome the force of return spring 136.

Valve 30 further includes a check valve assembly generally designated 62. This piloted valve is acceptable for use only in the type of hydraulic circuit as shown in FIG. 1 whereby there is to be a check valve 62 in the system. Advantages of the piloted valve as shown in FIG. 2 are many including (i) the check valve may be incorporated within the pilot valve structure itself, as shown, thereby assisting manufacture and assembly and (ii) there is minimal opportunity for air entrapment since any fluid chamber and brake line between the two check balls 154 and 208 have virtually been eliminated, thereby enhancing the evacuate and fill bleed procedure.

The check valve 62 includes a pair of concentrically arranged sleeve members, namely an outer sleeve 200 and an inner sleeve 202. The outer sleeve includes a throughbore 204 which includes a valve seat 206 at one end. The inner sleeve is press-fitted within the outer sleeve and includes a ball valve 208 in axial free floating clearance relation within a throughbore within the inner sleeve. The inner sleeve further includes a flow passage 210 in open fluid communication with orifice 156 to provide free unidirectional flow from line 110 and to the driven brake line 112 and the master cylinder. A fluid filter 212 is provided at one end of the outer sleeve. A cylindrical expansion sleeve 213 is forced fitted into the end of outer sleeve 200 to press-fit it within the throughbore of lower body portion 118. Fluid flow from line 110 will lift ball valve 208 to the fully opened position. On the other hand, differentially greater fluid pressure from line 112 will cause ball valve 208 to close on valve seat 206 to preclude all flow past the check valve 62, i.e. to line 110, or in other words, through the normally closed pilot valve 30.

Figure 3:
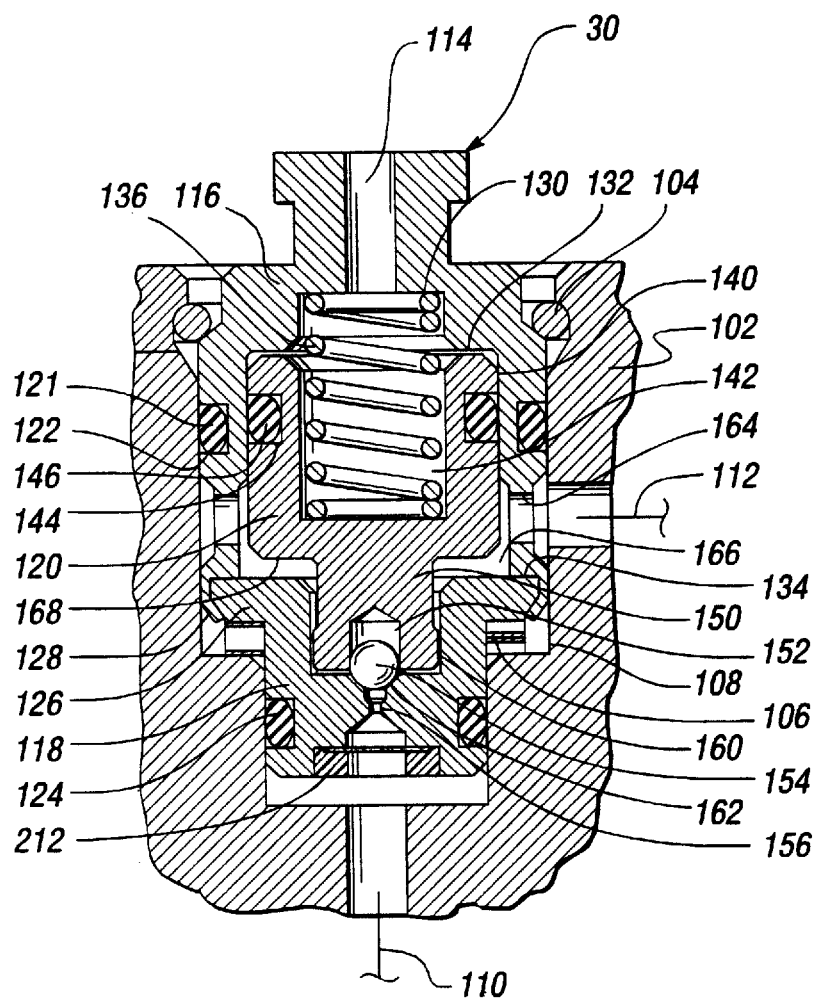
FIG. 3 is a view similar to FIG. 2 of an alternative embodiment of a normally closed pilot-operated switching valve in accordance with the present invention for use with the pedal non-isolated hydraulic circuits of FIG. 5.

An alternative embodiment for a normally closed piloted valve 30 is shown in FIG. 3 and does not include the check valve assembly 62 described above in connection with the switching valve of FIG. 2. In all other respects, it is the same as that of FIG. 2.

The normally closed pilot-operated switching valve as above-described in connection with FIG. 3 may be used in the hydraulic circuit of FIG. 5.

The TC supply valve 32 which is used in the system of FIG. 1 (and the alternate system of FIG. 5) between the master cylinder 16 and the pump inlet is a normally open pilot-operated valve. During traction control, this valve remains open to allow the pump to pull fluid from the master cylinder 16 via the supply line 36. During normal braking and ABS, when the brakes are applied, this valve closes when the master cylinder generates approximately 85 p.s.i.g. (5.8 Atm), thereby preventing fluid flow in the supply line 36.

Figure 4:
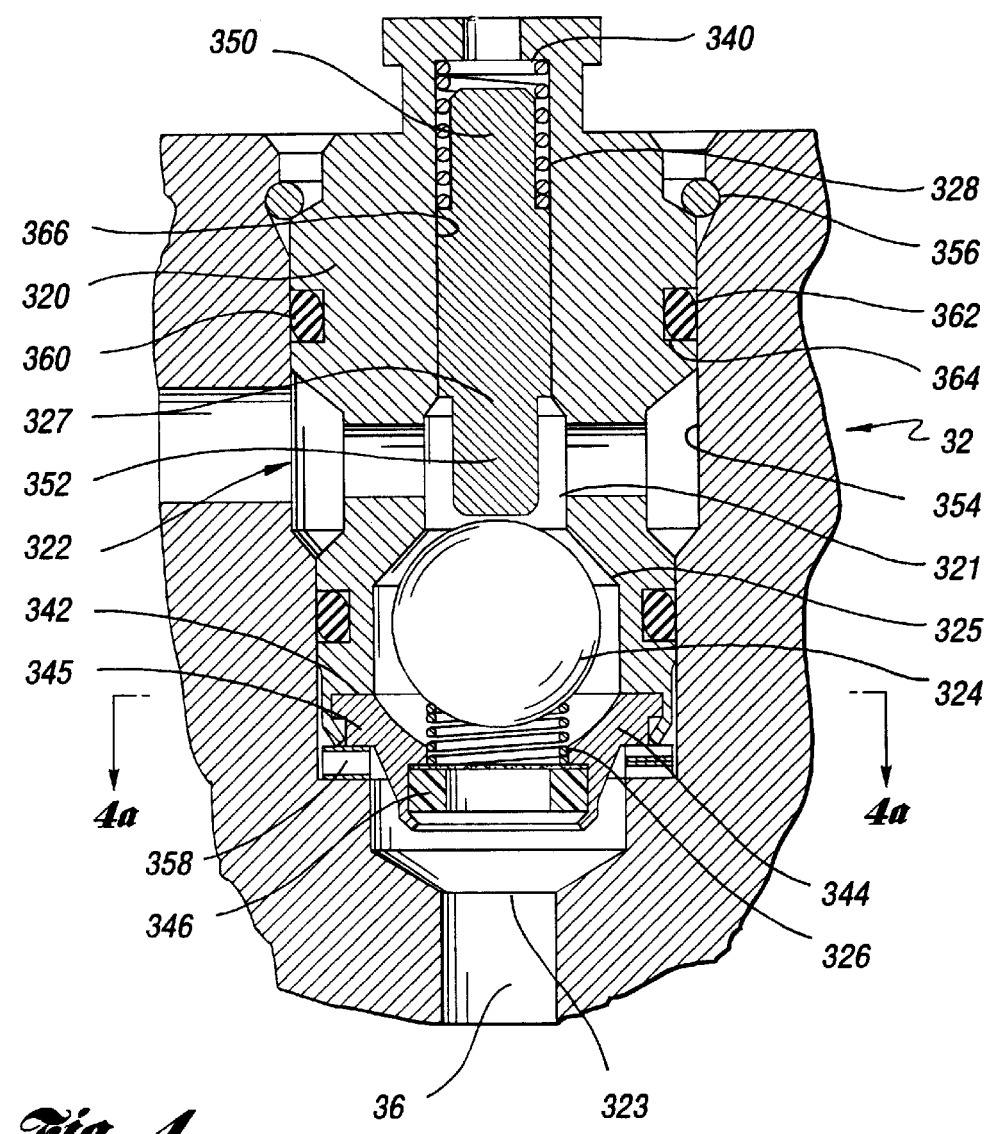

A cross sectional view of the specific valve design is shown in FIG. 4. It comprises a cylindrical sleeve 320 having an inner chamber 321, a first port 322 connected to the pump inlet, a second port 323 connected to the master cylinder and a valve seat 325. A check ball 324 is biased towards the valve seat 325 by a first spring 326. A piston 327 is located in the inner chamber 321 and is biased towards the check ball 324 by a second spring 328. Second spring 328 exerts a greater force against piston 327 than the force first spring 326 exerts against check ball 324. Therefore, piston 327 keeps check ball 324 away from valve seat 325 and the valve remains normally open for fluid flow in either direction between the first and second port.

When the fluid pressure on piston 327 reaches approximately 85 p.s.i.g. (5.8 Atm) the piston moves upward and the first spring 326 urges ball 324 to seat against valve seat 325, thereby closing the valve. This fluid pressure can reach the piston 327 through the second port 323 (connected to the master cylinder) by flowing around the unseated check ball 324, or through the first port 322 (connected to the pump inlet). When the valve is closed, the seated ball 324 will prevent fluid flow from the second port 323 (master cylinder) to the first port 322 (pump inlet), but fluid can flow in the opposite direction through flow channels 329 in the end closure member to port 323 as long as it provides enough pressure to overcome the force of the first spring 326. The flow channels 329 also allow fluid to flow from port 322 to port 323 when the ball is in the normally open, unseated position shown in FIG. 4.

During traction control dump mode as described regarding the FIG. 1 system, pressurized fluid is released from the driven wheel brake cylinders 22 and flows back to the master cylinder via the supply valve 32. Upon TC Dump, the low pressure accumulator 64 momentarily begins to fill at a set point of 20 p.s.i.g. which reduces the pressure of the fluid flowing into the first port 322 of valve 32 below the 85 p.s.i.g. (5.8 Atm) needed to move piston 327 and close valve 32. Instead, the fluid flows through valve 32 and returns to the master cylinder. The low pressure accumulator 64 then discharges its fluid which also flows back to the master cylinder via valve 32.

When the brakes are applied, the master cylinder generates enough pressure at the second port 323 of the supply valve 32 to move piston 327 and close the valve. This pressure then pushes upward on seated ball 324 keeping valve 32 closed. Since the ball 324 has a larger area than the piston 327, less pressure is required to maintain the valve closed then to initially close the valve. In particular, the valve 32 is kept closed until the pressure against the seated ball at the second port 323 drops to approximately 50 p.s.i.g. (3.4 Atm). Thus the valve 32 operates with hysteresis.

Figure 4A:
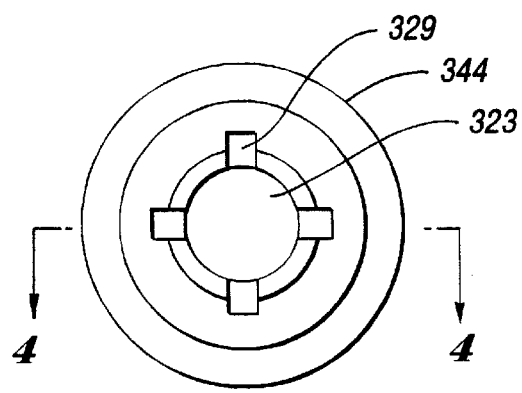
FIG. 4a is a plan view of the end closure member as taken along section line 4a—4a of FIG. 4.

Further details of the supply valve 32 according to the embodiment of FIG. 4 are as follows. Sleeve 320 has a concentric throughbore, counterbored at several locations to provide a stop shoulder 340 for piston return spring 328, the valve seat 325, and a further stop shoulder 342 for locating an end closure member 344. Within the throughbore there is located the piston return spring 328, the piston 327, check ball 324, ball return spring 326, and end closure member 344 which may or may not include a filter 346, all arranged in successive order as shown. The closure member includes one or more flow channels 329 appearing as equally spaced radial slots about the bore and ball seat of closure member 344 as shown in FIG. 4a. The closure member is crimped at 345 by the valve housing. The piston includes reduced diameter end portions 350, 352 which are identical in length and diameter so that the pin may be inserted from either end as a manufacturing convenience. The piston return spring is seated on the adjacent pin end portion 350. The valve is located within the hydraulic control unit, seated within a bore 354 and retained by means of a snap ring 356 held within a retaining channel of the HCU. A wave spring 358 is located at the end of the bore such that upon inserting the switching valve within the bore of the HCU, the spring 358 may be loaded by pushing the valve past the snap ring, and thereafter the wave spring will maintain the valve in compression against the retaining snap ring. Valve 32 is provided with an inlet port 323 in direct fluid communication with the fluid line 36 from the master cylinder 16. Further, outlet port 322 is in direct fluid communication with the pump inlet. Sleeve 320 is sealed against the HCU by means of O-rings 360 compression loaded to the known requirements for a static seal. In the embodiment shown in FIG. 4, the piston 327 also includes an O-ring 362 seated within an annular groove 364 and being loaded in compression relative to the adjacent cylinder wall 366 of the valve casing so as to load the seal consistent with design characteristics for a static seal. These design characteristics in a preferred embodiment include loading the seal to approximately 20–30% compression, preferably 28–30% i.e. the O-ring seal diameter for seal 362 in its uncompressed state being about 0.07 inches and being reduced in compression to a minor axis of about 0.05 inches. This degree of loading of the seal appears to considerably enhance the sealing characteristics of the piston. The high friction force created by this high degree of compression loading is overcome by the load of the return spring.

A unique feature of this design is the major diameter of the piston is limited in size to the minimum diameter of the valve seat. This assures that the volume of fluid required to shuttle the valve is maintained at an absolute minimum thereby enhancing the performance of the system and simplifies assembly of the valve.

In another embodiment (not shown) the piston O-ring seal 362 may be seated within the adjacent cylinder wall of the valve casing thereby allowing that the piston pin intermediate its end sections may be maintained at one consistent outer diameter throughout that portion of its length. No further modifications are necessary in the valve design to accommodate this design modification.

A further embodiment of the switching valve would be to eliminate the valve casing altogether, keeping the same internal components, but utilizing a bore of the HCU as the valve casing. Thus, the HCU would be bored to include a valve seat 325 accommodating the check ball 324, and a cylinder wall to accommodate the piston 327, return springs 326, 328 and filter.

An alternate embodiment of the hydraulic circuit shown in FIG. 5 is similar to that shown in FIG. 1 with the exception that the circuit does not include a check valve 62 nor line 110 leading from valve 30 to the junction of lines 42 and 46. Rather line 10 is junctured with line 50. This is referred to as an eight valve, pedal non-isolated system. Also, the high pressure relief valve and high pressure accumulator of the system shown in FIG. 1 are replaced by an attenuator 500 having an orifice 502 and a differential pressure type pilot-operated, 2-way relief valve 510. As noted above, check valve 68 is optional.

In operation then, the circuit of FIG. 5 would differ from that shown in FIG. 1 by the following:

On normal brake apply, pressure is applied through line 38 to both lines 110 and 111, then through common line 50 and to both wheels brake cylinders 22, 26 through respective lines 46 and 54.

Brake release operates identically to that described relative to FIG. 1, excepting all released fluid from the brake cylinder 22 of the driven wheel 20 must pass through the open (unactuated) isolation valve 44 to line 50 before branching into the afore-described dual paths.

In ABS in all modes, the ABS pump pressure pulses will be transmitted to the master cylinder and then to the brake pedal to alert the operator to the fact that the brakes are in the ABS mode. During ABS hold, pressurized fluid can flow from the pump outlet through line 50 to line 110, through the open actuated switching valve 30, through line 38 and back to the master cylinder 16. During ABS dump mode, solenoid valves 84 and 88 are actuated to open a path from the wheels to the low pressure accumulator 64 as stated above for the embodiment shown in FIG. 1. Additionally, fluid can flow from the pump outlet through line 50 to line 110, through valve 30 to line 38 and back to the master cylinder.

The traction control dump (and hold) mode of operation is different in that the pressurized fluid flows through line 111 and opens valve 510 flowing into line 38 and back into the supply line 36. Valve 510 is opened for flow in this direction when the pressure at the pump outlet reaches approximately 1200–1500 p.s.i.g. above the master cylinder pressure.

In addition to the brake position switch 700 described above, in all systems described there is also provided a second or supplemental brake switch 600. Only one switch 600 is required and it can be located in the main line 34, 234 of either half 10a, 10b of the system.

The supplemental brake switch 600 is a hydraulically actuated pressure switch and functions to signal the ECU 800 as to the status of the hydraulic brake circuit. The switch is actuated whenever the brakes are applied and the pressure in the main line 34, 234 exceeds a first predetermined pressure. When the brakes are applied during traction control the master cylinder pressure must be able to reach the wheel brakes for normal braking. This switch indicates that normal braking has begun and the wheel brakes should no longer remain isolated from the master cylinder. A first threshold pressure of approximately 125 p.s.i.g. is used for the systems disclosed, but a different actuation pressure can be used which fits the specific requirements of the system.

The brake pressure switch 600 returns to its unactuated state when the brake pressure falls below a second predetermined pressure. This second predetermined pressure can be the same pressure level as the first predetermined pressure or it can be different thereby forming a switching hysteresis. The second pressure threshold for the systems described above was chosen to be 85 p.s.i.g. which corresponds to the pressure at which the switching valve 30 closes. Thus, when the brake pressure switch 600 returns to its unactuated state, it indicates that the switching valve 30 has is returned to its unactuated position and is now closed.

This feature is used to prevent brake "hang-up" which may be apparent when the driver stops applying the brakes during ABS but the vehicle still continues to decelerate. This may happen if the brake pedal takes time to return to its unactuated position and deactuate the brake position switch. Under these circumstances, the electronic control unit will not know that the brakes were released and will still remain in ABS mode. Durng this time, the master cylinder pressure will decrease and switching valve 30 will close. With switching valve 30 closed, pump 70 running, and isolation valves 44 and 52 continuing to be shuttled for ABS operation, the fluid pressure at wheel brake cylinder 22 can increase above master cylinder pressure thereby applying the brakes.

The brake pressure switch can prevent brake "hang-up" by signaling the ECU 800 that the brake pedal was released when the master cylinder pressure falls below the second predetermined pressure. The ECU will cancel ABS mode and deactuate the isolation valves 44, 52. Any residual pressure at the wheel brake cylinder 22 can then be returned to the master cylinder via the unactuated open isolation valve 44, then 52, through check valve 60 and line 38. Although a second threshold of 85 p.s.i.g. is used, any pressure may be used which fits the specific requirements of the system.

Figure 6:
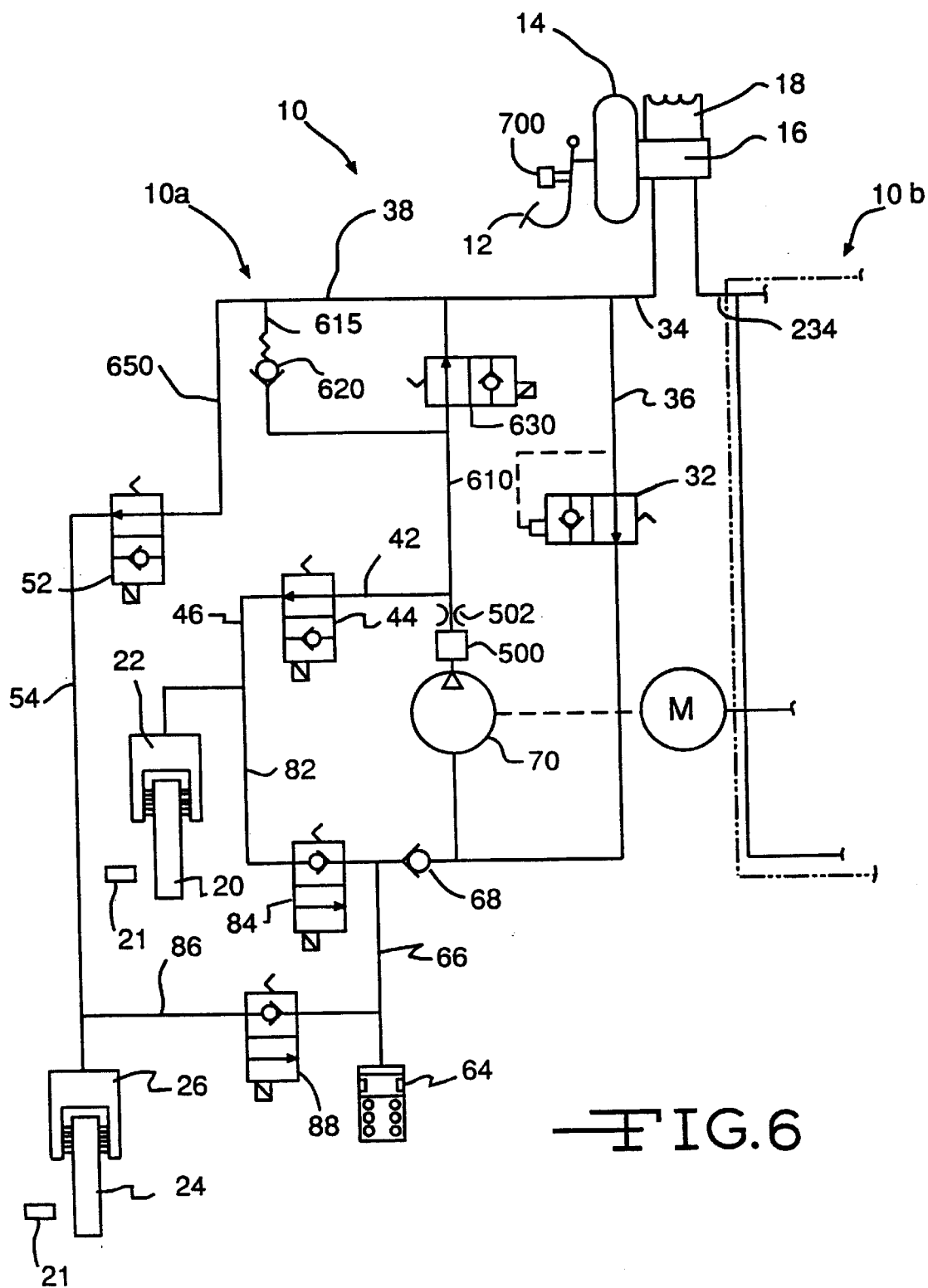
FIG. 6 is a schematic view of one-half of a diagonal split, pedal non-isolated type vehicular braking system including an ABS/TC unit in accordance with the present invention.

A second alternate embodiment of the hydraulic circuit shown in FIG. 6 is similar to that shown in FIG. 5. The components of FIG. 6 which correspond to FIG. 5 are numbered the same. The circuit in FIG. 6 is a 10-valve pedal non-isolated system and therefore does not include pilot-operated normally closed switching valve 30. Instead, a normally open solenoid operated switching valve 630 is used. Solenoid switching valve 630 is located in line 610 which connects line 38 to both line 42 and the output of pump 70. When unactuated, flow through valve 630 can be in either direction. When valve 630 is actuated, flow is only permitted in one direction, from line 38 to the pump outlet. 15 The differential pressure type pilot-operated, 2-way relief valve 510 is also not used. Instead, a bypass line 615 runs parallel to valve 630 and contains a one-way pressure relief valve 620. Relief valve 620 will allow flow from the pump outlet towards the master cylinder if a pressure on the pump side of the valve is great enough. In the example given herein, the relief valve will open at a pressure of 1500 p.s.i.g., but this pressure can be chosen based on the constraints of the system and may vary.

Another important difference between FIGS. 5 and 6 is that the non-driven wheel isolation valve 52 in FIG. 6 is not connected directly to the pump outlet as in FIG. 5, but rather to line 38 on the master cylinder side of valve 630 via line 650. Therefore, the dual return flow path from the driven wheel brake of the previous systems is not used in FIG. 6. The brake pressure switch 600 (of FIG. 5) may also be unnecessary.

In operation then, the circuit of FIG. 6 would differ from that shown in FIG. 5 by the following:

On normal brake apply, pressure is applied through line 38 to both lines 610 and 650. Pressure reaches the driven wheel brake cylinder 22 via open, unactuated switching valve 630, line 42, through open, unactuated isolation valve 44 and line 46. Pressure reaches the non-driven wheel brake cylinder 26 through line 650, open, unactuated isolation valve 52 and line 54. During brake release, pressurized fluid flows in the opposite direction as brake apply.

As in FIG. 5, in all ABS modes, the ABS pump pressure pulses will be transmitted to the master cylinder and then to the brake pedal to alert the operator to the fact that the brakes are in the ABS mode. These pressurized fluid pulses flow from the pump outlet to the master cylinder via line 610 and open, unactuated switching valve 630 to line 38. During ABS hold, pressurized fluid can flow from the pump outlet back towards the master cylinder following this same path.

Throughout all traction control modes switching valve 630 is actuated thereby preventing pressurized fluid from the pump outlet from reaching the master cylinder and the non-driven wheel isolation valve 52 via line 610. Therefore, isolation valve 52 does not have to be actuated during traction control apply.

During traction control hold mode, the driven-wheel isolation valve 44 is actuated thereby preventing pressurized fluid from the pump outlet from reaching wheel brake cylinder 22. As a result, pressure in line 610 and 615 will increase until relief valve 620 opens (at 1500 p.s.i.g.) allowing flow towards the master cylinder.

During traction control dump mode, pressurized fluid flows from the pump outlet towards the master cylinder via the relief valve 620. This fluid is recirculated towards the pump inlet via line 36 and open, unactuated supply valve 32, although immediately after the dump valve is opened fluid may flow in the opposite direction in line 36, from the dump valves to the master cylinder.

Figure 7:
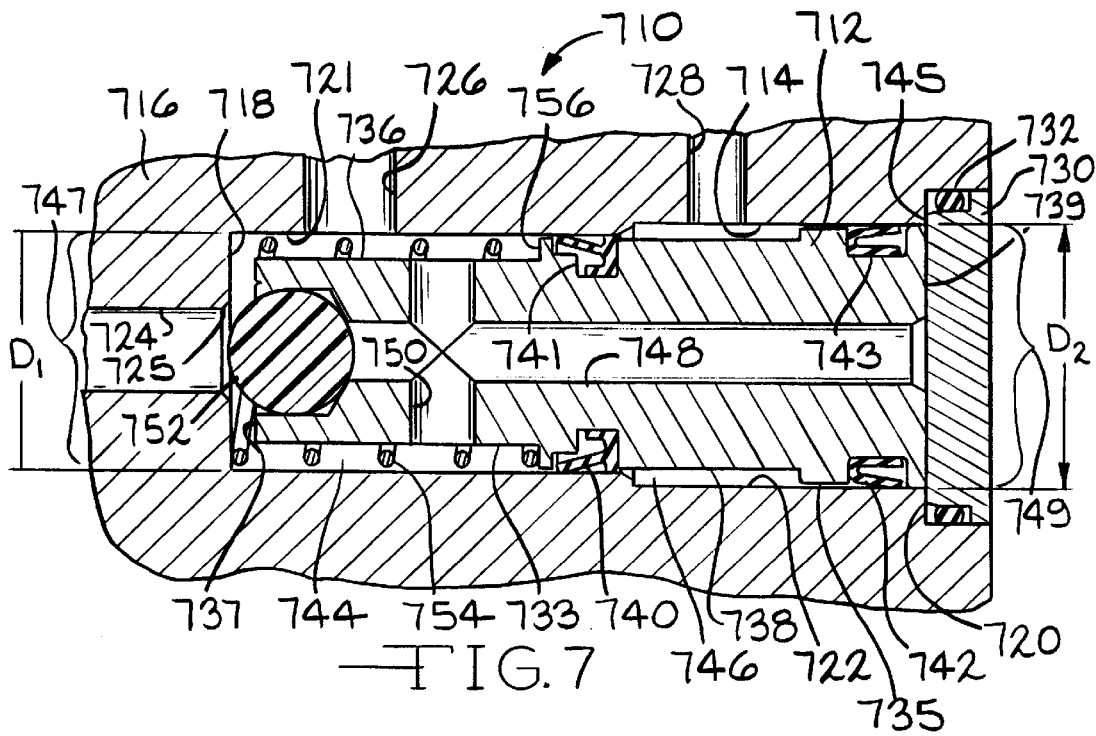
FIG. 7 is an elevation view in cross-section of an alternate embodiment of a normally open pilot operated pump supply valve in accordance with the present invention.

Referring now to FIG. 7, an alternate embodiment of a normally open, pilot operated pump inlet supply valve 710 is shown. The valve 710 includes a cylindrical, stepped piston or poppet 712 slidably disposed within in a stepped bore 714 formed in a housing 716. The housing 716 may be a valve block or any suitable valve container. The stepped bore 714 includes a first end 718, an open end 720, a first wall portion 721 having a first diameter $D_1$, and a second wall portion 722 having a second diameter $D_2$, wherein the second diameter $D_2$ is larger than the first diameter $D_1$. A first fluid conduit or port 724 is in fluid communication with the bore 714 by intersecting the first end 718. A tapered valve seat 725 is formed at the periphery of the intersection of the first port 724 and the first end 718. A second fluid conduit or port 726 is in fluid communication with the bore 714 by intersecting the first wall portion 721. A third fluid conduit or port 728 is in fluid communication with the bore 714 by intersecting the second wall portion 722. In the particular embodiment described below, a type of normally open pilot-operated pump inlet supply valve as shown in FIGS. 1, 5 and 6, the first port 724 is connected to conduit 36 which connects the bore 714 to the inlet of the pump 70. The second port 726 is connected to conduit 36 which connects the bore 714 to the master cylinder 16 via conduit 34. The third conduit 728 connects the bore 714 to a low reference pressure brake fluid source, preferably the accumulator 64 (shown in FIGS. 1, 5 and 6), although any low pressure brake fluid source may be used. The poppet 712 is retained within the bore 714 in a fluid tight manner by cap 730 and seal 732 at the open end 720 of the bore 714.

The stepped poppet 712 includes a first portion 736 having an outer surface 733 and a first end 737, and a second portion 738 having an outer surface 735 and a second end 739. A first low friction seal 740 is preferably disposed in a groove 741 in the first portion 736 of the poppet 712 to sealingly engage the poppet and the first wall portion 722, thereby defining a first pressure chamber 744 between the first seal 740 and the first end 718 of the bore 714. A second low friction seal 742 is preferably disposed in a groove 743 in the second portion 738 of the poppet 712 to sealingly engage the poppet and the second wall portion 722, thereby defining a second pressure chamber 745 between the second seal 742, the second poppet end 739 and the cap 730. The seals 740 and 742 move with the slideable poppet 712. Lip seals are preferably used for the low friction seals 740 and 742, but other low friction seals may be used. The seals may alternatively be disposed in grooves defined in the first and second wall portions 721 and 722 of the bore 714, and therefore, these seals will be stationary with respect to the slideable poppet 712. A third pressure chamber 746 is defined between the poppet 712, the first and second seals 740, 742, and the first and second wall portions 721 and 722 therebetween. The poppet 712 also includes a coaxial bore 748 and a radial bore 750 which intersects the coaxial bore 748. Together, the radial bore 750 and the coaxial bore 748 provide fluid communication through the poppet 712, between the first pressure chamber 744 and the second pressure chamber 745.

A valve sealing member 752 is disposed at the first end 737 of the poppet 712 for sealingly engaging the valve seat 725. The sealing member 752 is preferably spherical and preferably made of nylon, but any suitable shape and material may be used. A spring 754 is disposed between a shoulder 756 formed in the first poppet portion 736 and the first end 718 of the bore 714. The spring biases the poppet 712 to a normally position, away from the first end 718 of the bore 714, thereby keeping the valve sealing member 752 away from the valve seat 725.

The valve 710 operates as a normally open, pilot operated pump inlet supply valve (shown as valve 32 in FIGS. 1, 5 and 6). In the normal position as shown in FIG. 7, the valve sealing member 752 does not sealingly engage the valve seat 725 and the valve 710 is open thereby allowing fluid communication between the first pressure chamber 744 and conduits 724 and 726. The third pressure chamber 746 remains in fluid communication with the low reference pressure brake fluid source, such as accumulator 64, via conduit 728. When the fluid pressure in the first pressure chamber 744 increases, typically due to an increase in master cylinder 716 pressure from conduit 726, the fluid travels to the second pressure chamber 745 via conduits 750 and 748.

The fluid pressure in the second pressure chamber 745 is equal to the fluid pressure in the first pressure chamber 744. The fluid pressure in the first pressure chamber 744 acts on a first pressure responsive area 747 comprising the first seal 740 and the first poppet end 737. The first pressure responsive area 747 has a diameter equal to the bore diameter $D_1$. The fluid pressure acting against the first pressure responsive area 747 produces a force $F_1$ against the pressure responsive area 747. The fluid pressure in the second pressure chamber 745 acts on a second pressure responsive area 749 comprising the second seal 742 and the second poppet end 739. The second pressure responsive area 749 has a diameter equal to the bore diameter $D_2$. The second pressure responsive area 749 is larger than the first pressure responsive area 747 since the diameter $D_2$ is larger than the diameter $D_1$. Therefore, the fluid pressure acting against the second pressure responsive area 749 produces a force $F_2$ against the pressure responsive area 749 which is larger than the force $F_1$ acting against the first pressure responsive area 747. If the alternate, stationary seals described above are used, the forces $F_1$ and $F_2$ will act on areas having diameters which are slightly smaller than $D_1$ and $D_2$ and which are approximately equal to the diameters of the poppet at the seals.

When the pressure reaches a predetermined level, the force differential, $F_2-F_1$, becomes great enough to overcome the force of spring 754 which is urging the poppet 712 to the right, thereby moving the poppet to the left. When the poppet 712 moves a sufficient distance to the left, the sealing member 752 engages the valve seat 725 and closes off fluid communication between the first and second ports 724 and 726, and the master cylinder 16 is no longer in fluid communication with the inlet of the pump 70. While the valve 710 is closed, the master cylinder 16 is still in fluid communication with the first pressure chamber 744. The pressure at port 726 that causes the poppet 712 to shuttle is specified to be 40 p.s.i.g., although any other suitable shuttle pressure may be used. When the fluid pressure from the master cylinder 16 at port 726 is reduced to a predetermined level, the force differential F2–F1 is reduced below the force of the spring 754 and the poppet 712 is moved to the right, which moves the sealing member off the valve seat 725 and restores fluid communication between ports 724 and 726 and between the master cylinder 16 and the inlet of the pump 70.

The low friction seals 740 and 742 can be used because the first and second pressure chambers 744 and 745 are referenced to a low pressure chamber 746 which is connected to a low pressure brake fluid source. In prior art valves, the pressure chambers are referenced to the atmosphere, requiring a fluid-tight seal around the moving member, which is typically a poppet or piston, to prevent any leakage between the pressure chamber and the atmosphere. O-rings are typically used to form the fluid-tight seal but any tight forming seal can be used. These fluid-tight seals create high frictional forces against the sealed moving member, thereby necessitating larger forces and higher fluid pressures to open and close the valve. The low friction seals, such as the lip seals 740 and 742, do not generate such high frictional forces and the valve 710 can be opened at lower fluid pressures. Since the low friction seals do not seal as tightly, some leakage may occur, but the small amount of brake fluid leaking past the seals 740 and 742 only leaks into the low pressure brake fluid source and is recovered back into the brake system rather than being lost to the atmosphere.

Figure 8:
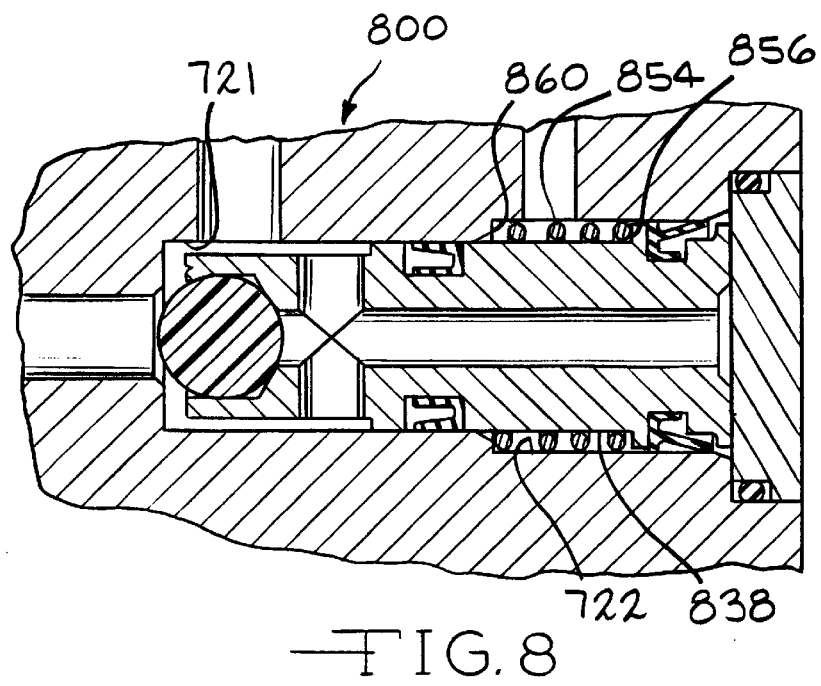
FIG. 8 is an elevation view in cross-section of a second alternate embodiment of a normally open pilot operated pump supply valve in accordance with the present invention.

Referring now to FIG. 8, an alternate valve 800 is shown. The valve 800 includes many parts which are similar to the valve 710 shown in FIG. 7, and only the differences will be discussed. The spring 854 is located between a shoulder 856 on the second poppet portion 838 and a shoulder 860 between the first wall portion 721 and the second wall portion 722 of the stepped bore 714. The valve 800 operates similarly to the valve 710 described above.

Figure 9:
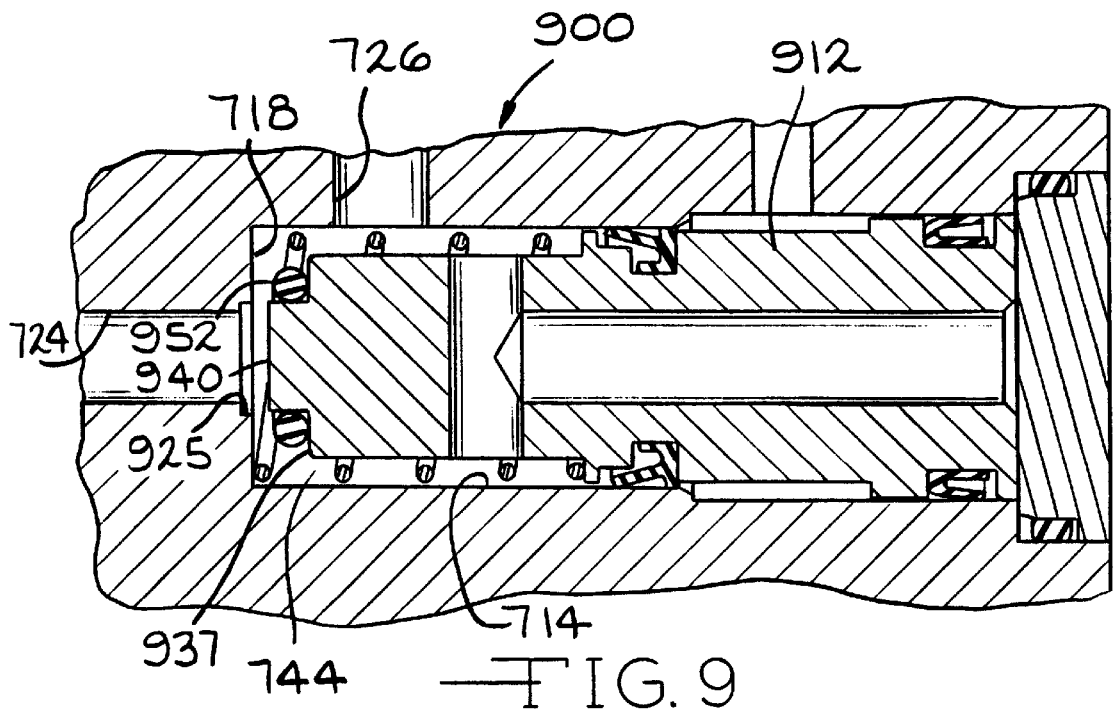
FIG. 9 is an elevation view in cross-section of a third alternate embodiment of a normally open pilot operated pump supply valve in accordance with the present invention.

Referring now to FIG. 9, an alternate valve 900 is shown. The valve 900 includes many parts which are similar to the valve 710 shown in FIG. 7, and only the differences will be discussed. The first poppet end 937 includes a cylindrical projection 940 which fits into a cylindrically shaped valve seat 925 formed at the intersection of port 724 and the first end 718 of the bore 714. A seal 952 surrounds the projection 940 to seal between the first end of the bore 718 and the first end of the poppet 937, thereby closing fluid communication between the first port 724 and the first pressure chamber 744 when the poppet 912 is moved to the left. The seal 952 is preferably an O-ring but any suitable seal can be used. The valve 900 operates similarly to the valve 710 described above.

Figure 10:
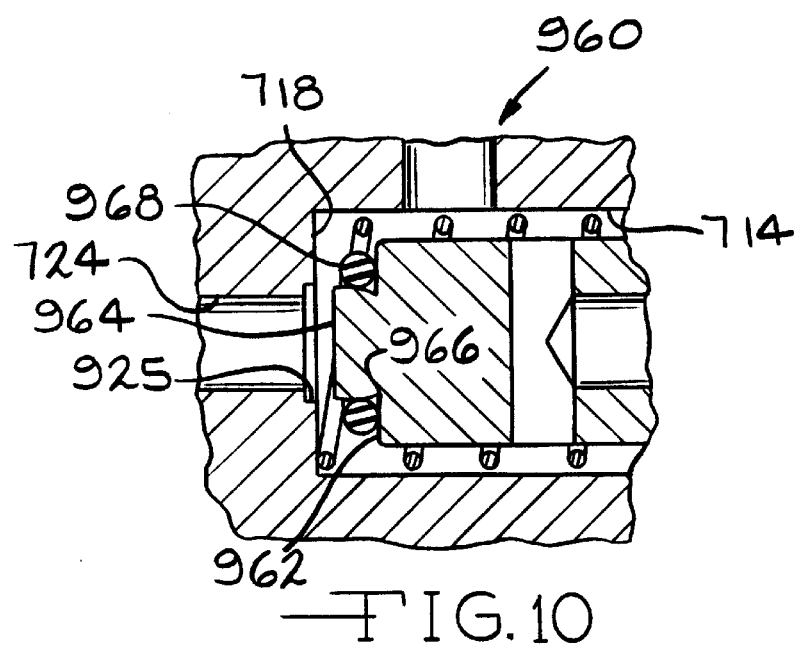
FIG. 10 is an elevation view in cross-section of a fourth alternate embodiment of a normally open pilot operated pump supply valve in accordance with the present invention.

Referring now to FIG. 10, an alternate valve 960 is shown. The valve 960 includes many parts which are similar to the valve 710 shown in FIG. 7, and only the differences will be discussed. The first poppet end 962 includes a projection 964 which fits into a cylindrically shaped valve seat 925 formed at the intersection of port 724 and the first end 718 of the bore 714. The projection 964 has an annular outer groove 966. A seal 968 surrounds the projection 964 in a similar manner as the seal 952 described above. The groove 966 helps to retain the seal 968 on the projection 964. The groove may have a curved cross sectional shape as shown, or it may have a rectangular cross sectional shape. The seal is preferably an O-ring, but it may have a shape which more closely conforms to the cross sectional shape of the groove. For example it may have an annular radially inwardly projecting portion (not shown) which fits into the groove to help retain the seal 968 on the projection 964. The valve 960 operates similarly to the valve 710 described above.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle braking system of a diagonally split type, said braking system comprising:
   a master cylinder providing brake fluid;
   a fluid pressure generating pump;
   a normally open, pilot-operated supply valve intermediate said master cylinder and said pump, said supply valve including a slidable piston mounted in a bore, said piston including first and second low friction seals mounted in respective grooves about said piston;
   a driven wheel and a non-driven wheel, each said wheel including a respective wheel brake cylinder in fluid communication with a wheel brake fluid pressure control valve assembly intermediate said wheel and said pump, said wheel brake fluid pressure control valve assembly including a dump valve having an inlet side and an outlet side;
   said dump valves being actuable to an open position and having a low pressure accumulator connected to said outlet side of said dump valves;
   a normally closed, pilot-operated switching valve having an inlet port and an outlet port, said outlet port being in direct fluid communication with said master cylinder, said inlet port being in direct fluid communication with said driven wheel brake cylinder for allowing fluid flow from said driven wheel brake cylinder through said switching valve in its actuated open position and back to said master cylinder, said inlet port including a one-way check valve, whereby flow is permitted from the brake cylinder to the master cylinder but not from the master cylinder to the brake cylinder; and
   said driven wheel brake cylinder further being in direct fluid communication with said master cylinder through said driven wheel brake fluid pressure control valve assembly and then through said non-driven wheel brake fluid pressure control valve assembly, whereby during the brake release portion of the normal braking mode, brake fluid being released from said driven wheel brake cylinder may flow through the dual paths of (i) through said actuated open switching valve and (ii) through said non-driven wheel brake fluid pressure control valve assembly.

2. The invention of claim 1 wherein said wheel brake fluid pressure control valve assembly includes a normally open solenoid actuated isolation valve for supplying brake fluid directly from (i) said master cylinder or (ii) through said pump, and said dump valve further comprising a normally closed solenoid actuated dump valve for evacuating brake fluid from the respective wheel brake cylinder.

3. The invention of claim 2, further including:
   a second one-way check valve intermediate the common fluid line leading from said master cylinder to the inlet side of said isolation valves and permitting flow in a direction only from the master cylinder to the isolation valves, said second one-way check valve also being in fluid communication with the output side of said pump and precluding pressure pulses from said pump from being transmitted to said master cylinder.

4. The invention of claim 3 wherein said normally closed, pilot-operated switching valve includes a third port venting to atmosphere in direct fluid communication with said master cylinder.

5. The invention of claim 1, further including:
   a one way check valve on the input side of said pump and intermediate said pump supply valve and said low pressure accumulator thereby precluding the filling of the low pressure accumulator except through the fluid being dumped through said dump valves from the respective wheel brake cylinders.

6. The invention of claim 1 wherein the inlet of said switching valve is connected directly to the inlet side of said isolation valve for the driven wheel intermediate said driven wheel isolation valve and said non-driven wheel isolation valve whereby during an ABS braking mode when the switching valve is in the actuated open position at brake pedal pressures above valve actuation pressure, the pressure pulses from the ABS mode will be fed back through said switching valve to said master cylinder.

7. The invention of claim 6 further including:
   a one way check valve on the input side of said pump and intermediate said pump supply valve and said low pressure accumulator thereby precluding the filling of said low pressure accumulator except through the fluid being dumped through said dump valves from the respective wheel brake cylinders.

8. The invention of claim 6 further including:

a fluid line common to the outlet side of said pump, the inlet side of said isolation valves and said master cylinder, said common fluid line including a one-way check valve permitting free flow of fluid at any pressure from the master cylinder to the inlet side of said isolation valves, said check valve being a pressure differential operated switching valve whereby fluid flow from the outlet side of said pump towards said master cylinder is permitted only when the pressure on the pump side of said pressure differential operated switching valve exceeds pressure on the master cylinder side of said pressure differential operated switching valve by a predetermined pressure.

9. A vehicle braking system of a diagonally split type, said braking system comprising:

a master cylinder providing brake fluid;

a fluid pressure generating pump;

a normally open, pilot-operated supply valve intermediate said master cylinder and said pump, said supply valve including a slidable piston mounted in a bore, said piston including first and second low friction seals mounted in respective grooves about said piston;

a driven wheel and a non-driven wheel, each said wheel including a respective wheel brake cylinder in fluid communication with a wheel brake fluid pressure control valve assembly intermediate said wheel and said pump, said wheel broke fluid pressure control valve assembly including a dump valve having an inlet side and an outlet side;

said dump valves being actuable to an open position and having a low pressure accumulator connected to said outlet side of said dump valves;

a normally closed, pilot-operated switching valve having an inlet port and an outlet port, said outlet port being in direct fluid communication with said master cylinder, said inlet port being in fluid communication with said driven wheel brake cylinder for allowing fluid flow from said driven wheel brake cylinder through said switching valve in its actuated open position and back to said master cylinder, wherein said normally closed, pilot-operated switching valve is actuable to an open position at a line pressure of approximately 85 p.s.i.g.; and said driven wheel brake cylinder further being in direct fluid communication with said master cylinder through said driven wheel brake fluid pressure control valve assembly and then through said non-driven wheel brake fluid pressure control valve assembly, whereby during the brake release portion of the normal braking mode, brake fluid being released from said driven wheel brake cylinder may flow through the dual paths of (i) through said actuated open switching valve and (ii) through said non-driven wheel brake fluid pressure control valve assembly.

\* \* \* \* \*